Patented May 26, 1953

2,639,969

UNITED STATES PATENT OFFICE 2,639,969

METHOD OF PREPARING A DYE-RECEPTIVE SYNTHETIC FIBER

George E. Ham, Dayton, Ohio, assignor, by mesne assignments, to The Chemstrand Corporation, a corporation of Delaware No Drawing. Application October 22, 1949, Serial No. 123,091

6 Claims. (Cl. 18—54)

This invention relates to a method of preparing acrylonitrile fibers capable of being dyed by conventional dyeing procedures. More specifically the invention relates to the convenient and economical method of treating fibers of a copolymer of acrylonitrile and vinyl esters of halogen substituted carboxylic acids to render them dye receptive.

Polymers of acrylonitrile, such as polyacrylonitrile and copolymers of acrylonitrile with minor proportions of other polymerizable compounds, such as vinyl acetate, methyl methacrylate and methacrylonitrile are known to be excellent fiber forming materials. These polymers, however, are not of wide utility as general purpose fibers because of the inherent poor dye susceptibility. In copending application Serial No. 106,490, filed July 23, 1949, of which application this is a continuation-in-part, there are described and claimed dye receptive copolymers and methods for their preparation from copolymers of acrylonitrile and vinyl esters of halogen substituted monocarboxylic acids. The said application covers the method of converting the said copolymers into dye receptive compositions by reaction with ammonia or amines, whereby the halogen atom is replaced by an amine or quaternary ammonium grouping. The amine salt copolymers, although they have unusual dye receptivity, are often difficult to fabricate into fiber due to the ephemeral stability of the solutions. Upon standing many acrylonitrile polymers become cross-linked and form gels which cannot be extruded into fibers. This is especially true when ammonia is used.

The primary purpose of the present invention is to provide a new method of forming dye receptive acrylonitrile polymers. A further purpose is to provide colored high tenacity fiber forming acrylonitrile polymers. A still further purpose of this invention is to provide a means of utilizing ammonia in converting copolymers of acrylonitrile and vinyl chloroacetate into dye receptive polymers.

It has been found that fibers prepared from copolymers of 75 to 98 percent by weight of acrylonitrile and from two to 25 percent of a vinyl ester of α-chloroacetic acid may be rendered dye receptive by reaction with ammonia. This method provides an effective means of avoiding the gelation of solutions which may occur when ammonia is used to develop the dye receptivity prior to the fiber spinning operation. The invention is practicable with copolymers of acrylonitrile and vinyl α-chloroacetate. Although the copolymers of 75 to 98 percent acrylonitrile and two to 25 percent of the vinyl α-chloroacetate may be utilized in the practice of this invention, preferred groups of copolymers are those of 80 to 95 percent acrylonitrile and five to 20 percent of the vinyl α-chloroacetate. The copolymers of from 75 to 80 percent acrylonitrile have unusually desirable dye receptivity, but often are found to have lower tenacity and other undesirable fiber properties. On the other hand, copolymers of 95 to 98 percent acrylonitrile and from two to five percent of the vinyl ester of the halogen substituted monocarboxylic acids have optimum fiber forming properties, but are often not sufficiently dye receptive for general purpose utility.

In the practice of this invention the copolymers of acrylonitrile and the vinyl α-chloroacetate may be prepared by any polymerization procedure, but the preferred practice utilizes emulsion polymerization procedures, wherein the copolymer is prepared in finely divided solid form for immediate use in the fiber fabrication operations. The preferred emulsion polymerization may utilize batch procedures, wherein the monomers are charged with an aqueous medium containing the necessary catalysts and dispersing agents. A more desirable method involves the semi-continuous procedure, in which the polymerization reactor containing the aqueous medium is charged with the desired monomers gradually throughout the course of the reaction. An entirely continuous method may also be used in which the monomers are gradually introduced to the reactor and the copolymers removed continuously.

The polymerization is catalyzed by means of any water soluble peroxy compound, for example sodium peroxide, hydrogen peroxide, sodium perborate, the sodium salts of other peroxy acids, the potassium, ammonium and other water soluble salts of peroxy acids, and any other water soluble compound containing a peroxy group (—O—O—). A wide variation in the quantity of peroxy compound is possible. For example, from 0.1 to 3.0 percent by weight of the polymerizable monomer may be used. The catalyst may be charged at the outset of the reaction, or it may be added continuously or in increments throughout the reaction for the purpose of maintaining a more uniform concentration of catalyst in the reaction mass. The latter method is preferred because it tends to make the resultant polymer more uniform in its chemical and physical properties.

Although the uniform distribution of the reactants throughout the reaction mass can be achieved by vigorous agitation, it is generally desirable to promote the uniform distribution of reagents by using inert wetting agents, or emulsion stabilizers. Suitable reagents for this purpose are the water soluble salts of fatty acids, such as sodium oleate and potassium stearate, mixtures of water soluble fatty acid salts, such as common soaps prepared by the saponification of animal and vegetable oils, the "amino soaps," such as salts of triethanolamine and dodecylmethylamine, salts of rosin acids and mixtures thereof, the water soluble salts of half esters of sulfuric acid and long chain alkyl alcohols, sulfonated hydrocarbons, such as alkyl aryl sulfonates, and any other of the wide variety of wetting agents, which are in general organic compounds containing both hydrophobic and hydrophilic radicals. The quantity of emulsifying agent will depend upon the particular agent selected, the ratio of monomer to be used, and the conditions of polymerization. In general, however, from 0.01 to one percent by weight of the monomers may be employed.

The preferred methods of operation are those which produce a copolymer of very uniform chemical and physical properties. Other characteristics of the copolymer are frequently of great importance, for example the particle size of the dispersion which is primarily concerned with the ease of filtration, the water to monomer ratio which must necessarily be low for the most economical production, and the yield and conversion of the monomers to copolymer.

The emulsion polymerizations are preferably conducted in glass or glass-lined vessels which are provided with a means for agitating the contents. Generally rotary stirring devices are the most effective means of insuring the intimate contact of the reagents, but other methods may be successfully employed, for example, by rocking or tumbling the reactors. The polymerization equipment generally used is conventional in the art and the adaptation of a particular type of apparatus to the reaction contemplated is within the province of one skilled in the art.

The optimum methods of polymerization for preparing fiber forming acrylonitrile polymers involve the use of polymerization regulators to prevent the formation of polymer units of excessive molecular weight. Suitable regulators are the alkyl and aryl mercaptans, carbon tetrachloride, chloroform, dithioglycidol and alcohols. The regulators may be used in amounts varying from .001 to two percent on the weight of the monomer to be polymerized.

When the polymerization is complete the polymer is separated from the aqueous medium by any of the conventionally used methods. If the dispersion is very stable it may be necessary to break the emulsion, for example by adding acids, bases, salts or alcohol. When the optimum procedures above described are used the polymer may be separated from the aqueous phase by filtration. The resulting polymer in either case may require washing operations to remove traces of soluble catalyst or dispersing agent.

The copolymers of acrylonitrile and the vinyl α-chloroacetate are spun into fibers by conventional procedures. The polymers are dissolved in suitable solvents, for example N,N-dimethylformamide, N,N-dimethylacetamide, and N,N-dimethylmethoxyacetamide, and the solutions extruded through a suitable die, or a spinneret containing a plurality of apertures into a medium which removes the solvent and precipitates the polymer in a continuous form. The spinning medium may be a liquid medium, for example glycerine, water, or aqueous solutions of salts, acids or bases, or aqueous mixtures of organic liquids, such as glycerine or even liquids which are solvents for the polyacrylonitrile. The use of aqueous mixtures of conventional acrylonitrile polymer solvents produces a fiber of more desirable physical properties than is prepared by precipitation into water alone. The fiber may also be extruded into air or other gaseous medium by conventional dry spinning methods.

In the practice of this invention the copolymers of acrylonitrile and vinyl esters of a halogen substituted monocarboxylic acid is treated with ammonia to render it dye receptive. Either aqueous ammonium hydroxide, or gaseous ammonia may be used effectively. The preferred practice involves the use of gaseous ammonia because a more complete and more rapid reaction can be obtained by the use of elevated temperatures not readily feasible with aqueous ammonia. The fiber may be treated with ammonia by passing it continuously through a vessel or chamber containing the ammonium hydroxide or gaseous ammonia. The fiber may also be treated by preparing skeins, spools or other packages of fiber and depositing them in the vessel containing the required atmosphere of ammonia. The latter practice is useful because it enables the use of gaseous ammonia under substantial pressure whereby complete permeation of the yarn package and into the interior of the individual fibers is possible. The use of ammonia under pressure also enables a more rapid and complete reaction than is otherwise feasible.

Further details of the practice of this invention are set forth with respect to the following examples:

*Example 1*

A glass reaction flask, provided with a dropping funnel, a thermometer, and a rotary stirring mechanism was charged with 740 grams of distilled water and one gram of the sodium salt of mixed mahogany acids and heated to 75–76° C. A mixture of 160 grams of acrylonitrile and 40 grams of vinyl α-chloroacetate was added gradually to the reaction mass through the dropping funnel at a rate which required 65 minutes for complete charging. A solution of one gram of potassium persulfate and 60 grams of water was prepared and added in six equal increments to the reaction mass, one increment initially and the other at ten minute intervals. After all of the monomer had been added to the mixture it was maintained at reflux conditions for an additional thirty minutes. The unreacted monomers were removed by steam distillation. A copolymer of 89 per cent acrylonitrile and eleven percent of vinyl α-chloroacetate was obtained in a yield of 79.6 percent.

The skein of the fiber prepared from the above copolymer was suspended in a stream of gaseous ammonia at 100° C. for fifteen minutes. The fiber so treated exhausted the dye bath of "Wool Fast Scarlet G Supra," whereas the untreated fiber absorbed little or no dye. In the dyeing test one gram of fiber skein was immersed in a mixture of one ml. of two percent "Wool Fast Scarlet G Supra," five mls. of three percent sulfuric acid, and forty mls. of water for one hour at 100° C.

Example 2

Using procedures similar to those described in the preceding experiment, various samples of copolymers of 89 percent acrylonitrile and eleven percent vinyl α-chloroacetate, were dissolved to the extent of 22 percent in N,N-dimethylacetamide and extruded into a mixture of 33 percent water and 67 percent dimethylacetamide, and subsequently treated with ammonia at temperatures and for periods of time set forth in the following tabulation. This tabulation also describes the result of the conventional dye treatment, the details of which are set forth in the preceding example.

| Time | Temperature, °C. | Dyeing Result |
|---|---|---|
| 5 Min | 100 | Moderate dye pickup. |
| 10 Min | 100 | Very good dye pickup. |
| 15 Min | 100 | Good dye pickup. |
| 1 Min | 120 | Fair dye pickup—Fiber slightly discolored. |
| 5 Min | 50 | Fair dye pickup. |
| 15 Min | 50 | Do. |

Example 3

Another sample of a fiber of 92 percent acrylonitrile and eight percent vinyl α-chloroacetate which was extruded from a 16 percent solution in dimethylacetamide, was treated for 15 minutes at 100° C. and a very good dye effect was achieved in which the "Wool Fast Scarlet G Supra" dye bath was exhausted. The same sample also exhausted the standard dye bath of Acid Green CC Extra Concentrated and Alizarin Lt. Blue 4GL. These samples showed excellent laundering and dry cleaning properties.

Example 4

Skeins of fiber prepared from copolymers of 92 percent acrylonitrile and eight percent vinyl chloroacetate were immersed in aqueous ammonia at room temperature for five, fifteen, thirty and sixty minute periods. After washing thoroughly the samples were dyed with a standard bath solution of Wool Fast Scarlet for one hour at 100° C. Good color development was attained in the case of every sample except that of the five minute treatment, in which the dye pickup was only moderate.

Example 5

A copolymer of 7.8 percent of vinyl chloroacetate and 92.2 percent acrylonitrile was prepared by the method described in Example 1. Fibers spun therefrom were treated with ammonia gas at 100° C. for fifteen minutes. Analysis of the fiber indicated that 55.5 percent of the chlorine had been replaced.

The invention is defined by the following claims.

I claim:

1. A method of preparing a dye-receptive fiber, which comprises preparing a solution of a copolymer of 75 to 98% acrylonitrile and two to 25% of a vinyl ester of alpha-chloroacetic acid, extruding the solution into a medium capable of extracting the solvent, and reacting the resulting finished fiber by treating the fiber with ammonia for a period of one minute to one hour at a temperature in the range of 50° to 120° C., and continuing the treatment until a dye-receptive fiber is produced.

2. The method as defined in claim 1 wherein the resulting finished fiber is treated with aqueous ammonia.

3. The method as defined in claim 1 wherein the resulting finished fiber is treated with gaseous ammonia.

4. A method of preparing a dye-receptive fiber, which comprises preparing a solution of a copolymer of 85 to 95% acrylonitrile and 5 to 15% of vinyl chloroacetate, extruding the solution into a medium capable of extracting the solvent, and reacting the resulting finished fiber by treating the fiber with ammonia for a period of one minute to one hour at a temperature in the range of 50° to 120° C., and continuing the treatment until a dye-receptive fiber is produced.

5. The method as defined in claim 4 wherein the resulting finished fiber is treated with aqueous ammonia.

6. The method as defined in claim 4 wherein the resulting finished fiber is treated with gaseous ammonia.

GEORGE E. HAM.

References Cited in the file of this patent

UNITED STATES PATENTS

| Number | Name | Date |
|---|---|---|
| 2,354,210 | Jacobson | July 25, 1944 |
| 2,436,926 | Jacobson | Mar. 2, 1948 |